United States Patent
Wan et al.

(10) Patent No.: US 10,609,721 B2
(45) Date of Patent: Mar. 31, 2020

(54) WIRELESS ACCESS POINT WITH TWO RADIO FREQUENCY MODULES OF SAME FREQUENCY BAND AND SIGNAL INTERFERENCE REDUCTION METHOD

(71) Applicant: Huawei Technologies Co., Ltd., Shenzhen (CN)

(72) Inventors: Xiaobing Wan, Suzhou (CN); Wei Ruan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 15/385,485

(22) Filed: Dec. 20, 2016

(65) Prior Publication Data

US 2017/0188382 A1    Jun. 29, 2017

(30) Foreign Application Priority Data

Dec. 24, 2015    (CN) .......................... 2015 1 0988344

(51) Int. Cl.
    *H04W 72/12*      (2009.01)
    *H04B 1/04*       (2006.01)
                 (Continued)

(52) U.S. Cl.
    CPC ...... *H04W 72/1236* (2013.01); *H04B 1/0475* (2013.01); *H04B 1/40* (2013.01);
              (Continued)

(58) Field of Classification Search
    CPC .......................... H04W 72/1236; H04B 1/0475
    See application file for complete search history.

(56) References Cited

U.S. PATENT DOCUMENTS

| | | | |
|---|---|---|---|
| 2002/0002052 A1* | 1/2002 | McHenry | H04W 72/08 455/447 |
| 2002/0181492 A1 | 12/2002 | Kasami et al. | |
| | | (Continued) | |

FOREIGN PATENT DOCUMENTS

| | | |
|---|---|---|
| CN | 1889380 A | 1/2007 |
| CN | 102378195 A | 3/2012 |
| | (Continued) | |

OTHER PUBLICATIONS

Fei Zhou,"Research on TD-LTE and Wi-Fi In-Device Interfering Avoidng Technology", Beijing University of Posts and Telecommunications, 2012, 59 pages.

*Primary Examiner* — Jael M Ulysse
(74) *Attorney, Agent, or Firm* — Slater Matsil, LLP (57) ABSTRACT

Embodiments of the present invention disclose a wireless access point, including: a first radio frequency module, a second radio frequency module, and a processor. A frequency band of the first radio frequency module is the same as that of the second radio frequency module; the first radio frequency module and the second radio frequency module work on different channels; a first transmit power upper limit of the first radio frequency module is greater than a second transmit power upper limit of the second radio frequency module; and the processor is configured to schedule a terminal whose signal strength is greater than a threshold to associate with the wireless access point by using the second radio frequency module. The complexity of hardware design for integrating two radio frequency modules of a same frequency band into one AP may be reduced.

17 Claims, 2 Drawing Sheets

(51) Int. Cl.
| | |
|---|---|
| *H04B 1/40* | (2015.01) |
| *H04W 52/14* | (2009.01) |
| *H04L 12/26* | (2006.01) |
| *H04W 72/04* | (2009.01) |
| *H04W 72/08* | (2009.01) |
| *H04W 52/34* | (2009.01) |
| *H04W 52/24* | (2009.01) |
| *H04W 84/12* | (2009.01) |
| *H04W 88/08* | (2009.01) |

(52) U.S. Cl.
CPC .......... *H04L 43/16* (2013.01); *H04W 52/143* (2013.01); *H04W 72/0453* (2013.01); *H04W 72/0473* (2013.01); *H04W 72/082* (2013.01); *H04W 72/085* (2013.01); *H04W 72/1215* (2013.01); *H04W 52/243* (2013.01); *H04W 52/34* (2013.01); *H04W 72/1231* (2013.01); *H04W 84/12* (2013.01); *H04W 88/08* (2013.01)

(56) References Cited

U.S. PATENT DOCUMENTS

| | | | |
|---|---|---|---|
| 2004/0017794 A1* | 1/2004 | Trachewsky | H04W 48/20 370/338 |
| 2004/0082356 A1* | 4/2004 | Walton | H04B 7/022 455/522 |
| 2004/0166864 A1* | 8/2004 | Hill | H04W 36/0055 455/450 |
| 2004/0259563 A1* | 12/2004 | Morton | H01Q 1/246 455/452.2 |
| 2005/0068925 A1* | 3/2005 | Palm | H04W 64/00 370/338 |
| 2005/0271012 A1* | 12/2005 | Agrawal | H04W 36/18 370/331 |
| 2005/0272432 A1* | 12/2005 | Ji | H04W 72/082 455/449 |
| 2007/0274256 A1* | 11/2007 | Murai | H04W 72/085 370/328 |
| 2008/0152030 A1* | 6/2008 | Abramov | H04B 7/0617 375/260 |
| 2008/0207143 A1* | 8/2008 | Skarby | H04B 1/0475 455/103 |
| 2008/0267079 A1* | 10/2008 | Mhatre | H04W 74/0808 370/248 |
| 2009/0247206 A1* | 10/2009 | Yacono | H04W 24/02 455/515 |
| 2009/0258607 A1* | 10/2009 | Beninghaus | H04B 1/3805 455/77 |
| 2010/0067471 A1* | 3/2010 | Matsuzawa | H04L 5/003 370/329 |
| 2011/0199900 A1* | 8/2011 | Ludwig | H04L 41/0893 370/230.1 |
| 2011/0207494 A1* | 8/2011 | Zhu | H04B 7/024 455/509 |
| 2012/0263215 A1* | 10/2012 | Peng | H04B 1/0475 375/221 |
| 2012/0275320 A1* | 11/2012 | Iyer | H04W 16/14 370/252 |
| 2013/0286955 A1* | 10/2013 | Morinaga | H04W 72/1226 370/329 |
| 2014/0003275 A1* | 1/2014 | Morimoto | H04W 24/10 370/252 |
| 2014/0029535 A1* | 1/2014 | Medapalli | H04W 72/1215 370/329 |
| 2014/0136921 A1* | 5/2014 | Murakami | H03M 13/1154 714/758 |
| 2014/0211713 A1* | 7/2014 | Ito | H04L 5/0048 370/329 |
| 2015/0003370 A1* | 1/2015 | Yokomakura | H04W 52/24 370/329 |
| 2015/0029965 A1* | 1/2015 | Aminaka | H04W 88/085 370/329 |
| 2015/0146548 A1* | 5/2015 | Wang | H04W 52/04 370/252 |
| 2015/0181609 A1* | 6/2015 | Nusairat | H04L 5/006 370/329 |
| 2015/0280657 A1* | 10/2015 | Cheng | H03F 1/3241 375/297 |
| 2015/0303741 A1* | 10/2015 | Malik | H04B 5/0037 307/104 |
| 2015/0318878 A1* | 11/2015 | Damodaran | H04B 7/04 375/296 |
| 2015/0365908 A1* | 12/2015 | Maltsev | H04W 52/267 455/522 |
| 2016/0156392 A1* | 6/2016 | Jung | H04W 72/048 |
| 2016/0173361 A1* | 6/2016 | Somasundaram | H04L 43/16 370/328 |
| 2016/0381706 A1* | 12/2016 | Huang | H04W 74/0808 370/329 |
| 2017/0013560 A1 | 1/2017 | Ruan | |
| 2017/0041095 A1* | 2/2017 | Hwang | H04B 1/0475 |

FOREIGN PATENT DOCUMENTS

| | | |
|---|---|---|
| CN | 103368590 A | 10/2013 |
| CN | 104159239 A | 11/2014 |
| JP | 2003052079 A | 2/2003 |
| JP | 2013034053 A | 2/2013 |
| JP | 2013090256 A | 5/2013 |
| WO | 2015144016 A1 | 10/2015 |

\* cited by examiner

WIRELESS ACCESS POINT WITH TWO RADIO FREQUENCY MODULES OF SAME FREQUENCY BAND AND SIGNAL INTERFERENCE REDUCTION METHOD

CROSS-REFERENCE TO RELATED APPLICATIONS

This application claims priority to Chinese Patent Application No. 201510988344.2, filed on Dec. 24, 2015, which is hereby incorporated by reference in its entirety.

TECHNICAL FIELD

This application relates to the field of communications technologies, and in particular, to a wireless access point with two radio frequency modules of a same frequency band and a signal interference reduction method.

BACKGROUND

In a wireless local area network (WLAN) product, integrating multiple radio frequency modules (RF module) into one access point (AP) may reduce costs of obtaining a single radio frequency resource by a user. However, the integration of the multiple radio frequency modules into the one AP likely results in interference between respective frequency bands of two radio frequency modules due to a short distance between the two radio frequency modules.

In a solution of integrating the two radio frequency modules into the one AP, frequency bands of the two radio frequency modules are different, which are generally 2.4 gigahertz (GHz) and 5 GHz respectively. An interval between the frequency bands of the two radio frequency modules is relatively long, and signal interference between the two radio frequency modules is relatively weak. However, when the two radio frequency modules integrated into the one AP are two radio frequency modules of a same frequency band, because an interval between center frequencies of channels of the two radio frequency modules is relatively short, adjacent channel attenuation between the two channels is relatively small, and as a result the signal interference between the two radio frequency modules is relatively strong. In this case, if the signal interference between the two radio frequency modules needs to be reduced, power of a signal transmitted by one radio frequency module needs to be reduced when the signal arrives at the other radio frequency module. If transmit power of a radio frequency module is reduced, a coverage area of the AP is relatively small. If the interval between the two radio frequency modules is increased, a volume of the AP is excessively large. If a special physical device is disposed between the two radio frequency modules to prevent the signal interference between the two, a hardware design requirement is relatively high, and a structure of the AP is complex.

SUMMARY

This application provides a wireless access point with two radio frequency modules of a same frequency band and a signal interference reduction method, which can reduce interference between two radio frequency modules of a same frequency band and reduce complexity of hardware design for integrating two radio frequency modules of a same frequency band into one AP.

A first aspect provides a wireless access point, which may include at least two radio frequency modules and a processor. The at least two radio frequency modules include a first radio frequency module and a second radio frequency module. A frequency band of the first radio frequency module is the same as that of the second radio frequency module. The first radio frequency module works on a first channel. The second radio frequency module works on a second channel. A first transmit power upper limit of the first radio frequency module is greater than a second transmit power upper limit of the second radio frequency module. The processor is configured to schedule a terminal whose signal strength is greater than a threshold and that is of at least one terminal associated with the wireless access point by using the first radio frequency module. After being scheduled, the terminal whose signal strength is greater than the threshold is associated with the wireless access point by using the second radio frequency module.

In this application, two radio frequency modules of a same frequency band are integrated into a single AP, where a first radio frequency module works on a first channel and transmits a signal by using a first transmit power upper limit, and a second radio frequency module works on a second channel and transmits a signal by using a second transmit power upper limit that is less than the first transmit power upper limit, which may reduce signal interference with signal reception and transmission of the first radio frequency module by signal transmission of the second radio frequency module. In addition, after being scheduled, a terminal with great signal strength is associated with the AP by using the second radio frequency module. Although interference with the second radio frequency module by signal transmission of the first radio frequency module is strong, a terminal communicating with the second radio frequency module has great signal strength, and is not interfered. According to this application, a coverage area of the AP with the two radio frequency modules of a same frequency band is ensured, and complexity of hardware design for the AP is reduced.

With reference to the first aspect, in a first possible implementation manner, the threshold is a product of designed interference noise of the second radio frequency module and a signal-to-noise ratio corresponding to the second radio frequency module. The designed interference noise of the second radio frequency module is a power value of interference with signal reception of the second radio frequency module when the first radio frequency module transmits a signal by using the first transmit power upper limit.

In this application, a terminal signal strength threshold scheduled by a terminal is set to be a product of designed interference noise of a second radio frequency module and a signal-to-noise ratio corresponding to the second radio frequency module, to satisfy a requirement that a ratio between signal strength of a terminal associated with an AP by using the second radio frequency module and interference with the second radio frequency module by signal transmission of a first radio frequency module be greater than the signal-to-noise ratio, so that the second radio frequency module can properly receive a signal sent by the terminal.

With reference to the first aspect, in a second possible implementation manner, the processor is further configured to raise a clear channel assessment CCA threshold of the second radio frequency module, so that a raised CCA threshold of the second radio frequency module is greater than designed interference noise of the second radio frequency module. The designed interference noise of the second radio frequency module is a power value of interference with signal reception of the second radio frequency module when the first radio frequency module transmits a signal by using the first transmit power upper limit.

In this application, a CCA threshold of a second radio frequency module is raised, so that interference with the second radio frequency module by signal transmission of a first radio frequency module does not affect signal transmission of the second radio frequency module.

With reference to the second possible implementation manner of the first aspect, in a third possible implementation manner, the threshold is a product of the raised CCA threshold of the second radio frequency module and a signal-to-noise ratio corresponding to the second radio frequency module.

In this application, a terminal signal strength threshold scheduled by a terminal is set to be a product of a raised CCA threshold of a second radio frequency module and a signal-to-noise ratio corresponding to the second radio frequency module, so as to ensure that a signal sent by a terminal connected to a second channel can still be properly received after the CCA threshold of the second radio frequency module is raised.

With reference to any one of the first aspect to the third possible implementation manner of the first aspect, in a fourth possible implementation manner of the first aspect, an isolation between the first radio frequency module and the second radio frequency module is less than an isolation that is between the first radio frequency module and the second radio frequency module and that is required when transmit power upper limits of the first radio frequency module and the second radio frequency module are both the first transmit power upper limit.

With reference to any one of the first aspect to the fourth possible implementation manner of the first aspect, in a fifth possible implementation manner of the first aspect, an intersection of a first available channel set of the first radio frequency module and a second available channel set of the second radio frequency module is an empty set, and the first channel and the second channel are two proximal channels in the first available channel set and the second available channel set.

A second aspect provides a signal interference reduction method, which may include detecting, by a wireless access point, signal strength of each terminal of at least one terminal associated with the wireless access point by using a first radio frequency module of the wireless access point. The method further includes scheduling, by the wireless access point, a terminal whose signal strength is greater than a threshold and that is of the at least one terminal, so that after being scheduled, the terminal whose signal strength is greater than the threshold is associated with the wireless access point by using a second radio frequency module of the wireless access point. A frequency band of the first radio frequency module is the same as that of the second radio frequency module, the first radio frequency module works on a first channel, and the second radio frequency module works on a second channel. A first transmit power upper limit of the first radio frequency module is greater than a second transmit power upper limit of the second radio frequency module.

With reference to the second aspect, in a first possible implementation manner, the threshold is a product of designed interference noise of the second radio frequency module and a signal-to-noise ratio corresponding to the second radio frequency module. The designed interference noise of the second radio frequency module is a power value of interference with signal reception of the second radio frequency module when the first radio frequency module transmits a signal by using the first transmit power upper limit.

With reference to the second aspect, in a second possible implementation manner, the method further includes raising, by the wireless access point, a clear channel assessment CCA threshold of the second radio frequency module, so that a raised CCA threshold of the second radio frequency module is greater than designed interference noise of the second radio frequency module. The designed interference noise of the second radio frequency module is a power value of interference with signal reception of the second radio frequency module when the first radio frequency module transmits a signal by using the first transmit power upper limit.

With reference to the second possible implementation manner of the second aspect, in a third possible implementation manner, the threshold is a product of the raised CCA threshold of the second radio frequency module and a signal-to-noise ratio corresponding to the second radio frequency module.

With reference to any one of the second aspect to the third possible implementation manner of the second aspect, in a fourth possible implementation manner of the second aspect, an isolation between the first radio frequency module and the second radio frequency module is less than an isolation that is between the first radio frequency module and the second radio frequency module and that is required when transmit power upper limits of the first radio frequency module and the second radio frequency module are both the first transmit power upper limit.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

A receiver sensitivity threshold is a strength threshold (for example, a lowest demodulation threshold may be specified as −92 decibel-milliwatts (dBm)) of a received signal that can be demodulated by a radio frequency module. The radio frequency module demodulates a signal only when strength of the signal received by the radio frequency module is greater than the threshold. If the strength of the signal received by the radio frequency module is less than the threshold, the radio frequency module does not demodulate the signal.

A clear channel assessment (CCA) threshold (for example, which may be a CCA threshold of a preamble signal) is a strength threshold of a signal of a channel that is considered busy by the radio frequency module. If a carrier sense multiple access with collision avoidance (CSMA/CA) mechanism is used in a WLAN to coordinate access of multiple devices to a wireless medium, the radio frequency module performs signal detection on a channel before sending a signal. If detecting a signal whose strength is greater than the CCA threshold, the radio frequency module considers that the channel is busy. If the channel is busy, the radio frequency module performs a backoff procedure. The CCA threshold may be, for example, −83 dBm.

In two radio frequency modules, an isolation is a ratio between power of a signal transmitted by one radio frequency module and power of a signal that is transmitted by the first radio frequency module and that is received by the other radio frequency module on a same channel. The isolation generally uses a decibel (dB) as a unit. For example, a first radio frequency module transmits a signal on a channel 149. Power of the signal transmitted by the first radio frequency module is P1. The signal transmitted by the first radio frequency module is transmitted to a second radio frequency module. Due to a distance between the first radio frequency module and the second radio frequency module and impact of a propagation medium, after the signal transmitted by the first radio frequency module is transmitted to the second radio frequency module, power of receiving the foregoing signal by the second radio frequency module on the channel 149 is P2. A ratio between P1 and P2 is a signal attenuation degree, that is, an isolation between the first radio frequency module and the second radio frequency module. To prevent the signal transmitted by the first radio frequency module from interfering with signal reception of the second radio frequency module, the isolation between the first radio frequency module and the second radio frequency module needs to be greater than a specific threshold, so that when the signal transmitted by the first radio frequency module is transmitted to the second radio frequency module, signal strength after being attenuated on an adjacent channel is less than a receiver sensitivity threshold of the second radio frequency module.

Figure 1:
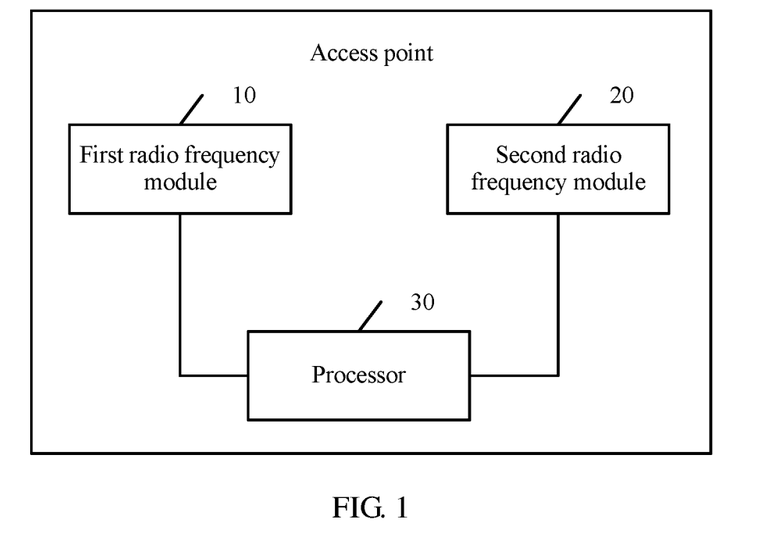
FIG. 1 is a schematic structural diagram of an access point according to an embodiment of the present invention.

FIG. 1 is a schematic structural diagram of an access point according to an embodiment of the present invention. The AP described in this embodiment of the present invention includes at least two radio frequency modules and a processor 30. The foregoing at least two radio frequency modules include a first radio frequency module 10 and a second radio frequency module 20, that is, the first radio frequency module 10 and the second radio frequency module 20 are integrated into a single AP.

Frequency bands of the first radio frequency module 10 and the second radio frequency module 20 are the same. The first radio frequency module 10 transmits a signal on a first channel. The second radio frequency module 20 transmits a signal on a second channel. A first transmit power upper limit of the first radio frequency module 10 is greater than a second transmit power upper limit of the second radio frequency module 20. A transmit power upper limit of a radio frequency module is maximum transmit power that may be used by the radio frequency module. The first transmit power upper limit of the first radio frequency module 10 may be a transmit power value of the first radio frequency module 10 working at full power. The first transmit power upper limit of the first radio frequency module 10 is large, so that a signal coverage area of the AP may be ensured. The second radio frequency module 20 may be a radio frequency module whose transmit power value is less than the first transmit power upper limit of the first radio frequency module 10 working at full power. The second radio frequency module 20 may also be a physical device that is the same as the first radio frequency module 10, and maximum transmit power of the second radio frequency module 20 is set to be less than a transmit power value of the second radio frequency module 20 working at full power.

A set of operating channels that may be used by the first radio frequency module 10 is a first channel set, and a set of operating channels that may be used by the second radio frequency module 20 is a second channel set. The first channel set does not overlap with the second channel set, that is, an intersection of the first channel set and the second channel set is an empty set. For an operating parameter (including a transmit power upper limit) of a radio frequency module of the AP and design for a physical structure of the AP, the AP is designed with a criterion of two operating channels whose frequencies are proximal in the first channel set and the second channel set. Adjacent channel attenuation between the two operating channels whose frequencies are proximal is minimum, and in this case, signal interference between the two radio frequency modules is maximum.

For example, when two 5 GHz radio frequency modules are integrated into a single AP, channels that may be selected by the second radio frequency module 20 include a channel 36, a channel 40, a channel 44, and a channel 48, and channels that may be selected by the first radio frequency module 10 include a channel 149, a channel 153, a channel 157, a channel 161, and a channel 165. Among the foregoing channels that may be selected by the two radio frequency modules, a center frequency of the channel 48 is separated from that of the channel 149 by 505 MHz. In this case, adjacent channel attenuation between the foregoing two channels is minimum. To ensure that the signal interference between the two radio frequency modules meets a requirement, a highest design criterion needs to be used. This channel selection status has a highest requirement for the isolation between the two radio frequency modules. When the first radio frequency module and the second radio frequency module select other channels, an interval between center frequencies of the channels selected by the two radio frequency modules is greater than 505 MHz. Although operating parameters of the radio frequency modules do not change (a physical structure of the AP does not change with a change of a selected channel), the signal interference between the two radio frequency modules also meets a requirement for signal interference between radio frequency modules. Therefore, to ensure that the design for the AP meets a required isolation between the radio frequency modules in different scenarios in which the foregoing two radio frequency modules select different channel combinations (for example, the channel 48 and the channel 149, or the channel 36 and the channel 149), the AP needs to be designed by using an example in which the channel combination of the channel 48 and the channel 149 is selected.

Likewise, if the radio frequency module transmits a signal without using maximum transmit power, interference with the other radio frequency module by the signal of the radio frequency module is less than interference generated when the signal is transmitted by using the maximum transmit power. To ensure that the design for the AP meets a case in which the two radio frequency modules both transmit signals by using maximum transmit power, the AP needs to be designed by using an example in which the two radio frequency modules both transmit the signals by using their respective maximum transmit power.

It is assumed that the first radio frequency module and the second radio frequency module transmit a signal by using same maximum transmit power, signal coverage areas of the first radio frequency module and the second radio frequency module are the same, that is, a first coverage area is the same as a second coverage area. In the assumption, the coverage area of the AP is ensured. However, because the same maximum transmit power is used, the signal transmitted by the first radio frequency module greatly interferes with the second radio frequency module, and the signal transmitted by the second radio frequency module greatly interferes with the first radio frequency module. Therefore, in this embodiment of the present invention, the first radio frequency module transmits the signal by using the maximum transmit power of 20 dBm, which may ensure a maximum coverage area of a signal transmitted by a radio frequency module on this frequency band. Transmit power of the second radio frequency module is reduced, so as to reduce interference with the first radio frequency module at a cost of reducing a coverage area of the second radio frequency module.

For example, the foregoing first radio frequency module 10 transmits the signal on the channel 149 at full power. It is assumed that the foregoing full power is 20 dBm, and the coverage area of the first radio frequency module 10 may be the first coverage area.

Figure 2:
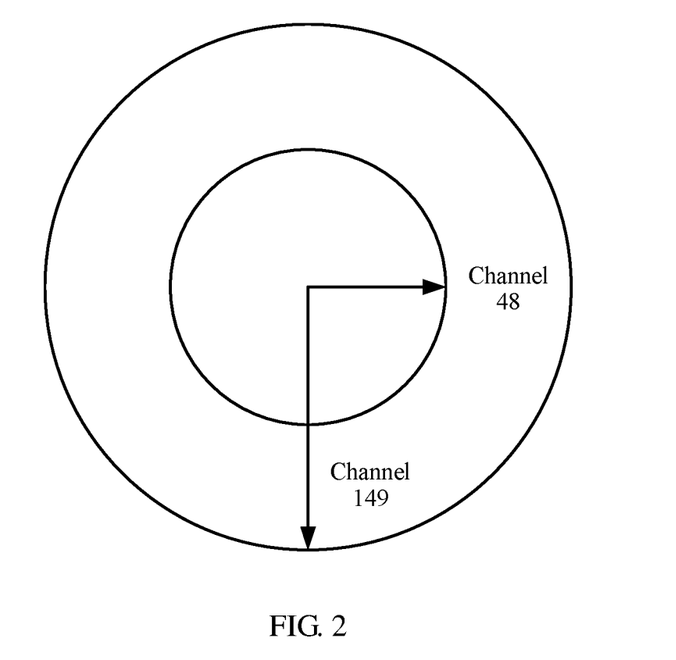
FIG. 2 is a schematic diagram of signal coverage areas of two radio frequency modules with different transmit power upper limits.

FIG. 2 is a schematic diagram of signal coverage areas of two radio frequency modules with different transmit power. The first coverage area of the first radio frequency module may be shown by an outer ring of a concentric circle in FIG. 2. The second radio frequency module 20 transmits the signal on the channel 48 by using the maximum transmit power. It is assumed that the foregoing maximum transmit power is 10 dBm, and the coverage area of the second radio frequency module may be the second coverage area, which is shown by an inner ring of the concentric circle in FIG. 2.

An adjacent channel rejection ratio (ACRR) between the channel 149 of the second radio frequency module 20 and the channel 48 of the first radio frequency module 10 is 42 dB. Therefore, if the isolation between the first radio frequency module 10 and the second radio frequency module 20 is x dB, signal strength (Q1) of the signal of the second radio frequency module 20 that is received by the first radio frequency module 10 is: Q1=10 dBm/x dB/42 dB. The receiver sensitivity threshold of the first radio frequency module 10 is −92 dBm. Therefore, to ensure that the signal transmitted by the second radio frequency module 20 does not interfere with the signal reception of the first radio frequency module 10, it is required that Q1≤−92 dBm. In this case, it can be learned that a required isolation x≥60 dB. That is, in the foregoing scenario, when the isolation between the first radio frequency module 10 and the second radio frequency module 20 reaches 60 dB, it can be ensured that the signal transmitted by the second radio frequency module 20 does not interfere with the signal reception of the first radio frequency module 10. Further, when the isolation between the first radio frequency module 10 and the second radio frequency module 20 reaches 60 dB, Q1≤−92 dBm. Because −92 dBm<−83 dBm, Q1≤−83 dBm, that is, Q1 is less than the CCA threshold of the first radio frequency module 10. The signal transmitted by the second radio frequency module 20 does not interfere with signal transmission of the first radio frequency module 10. That is, when the isolation between the first radio frequency module 10 and the second radio frequency module 20 is designed to be 60 dB, it can be ensured that the signal transmitted by the second radio frequency module 20 does not interfere with the signal reception of the first radio frequency module 10. Therefore, when the AP is designed, an example in which the isolation between the first radio frequency module 10 and the second radio frequency module 20 is 60 dB is used in the design.

However, when the isolation between the first radio frequency module 10 and the second radio frequency module 20 is 60 dB, signal strength (Q2) of the signal of the first radio frequency module 10 that is received by the second radio frequency module 20 is: Q2=20 dBm/60 dB/42 dB. In this case, it can be learned that Q2=−82 dBm. The receiver sensitivity threshold of the second radio frequency module 20 is −92 dBm. Therefore, Q2>−92 dBm in this case, that is, the strength of the signal of the first radio frequency module 10 that is received by the second radio frequency module 20 is greater than the receiver sensitivity threshold of the second radio frequency module 20. In this case, the first radio frequency module 10 becomes a noise source of the second radio frequency module 20, and the foregoing −82 dBm may be defined as designed interference noise of the second radio frequency module 20. That is, the foregoing designed interference noise of the second radio frequency module 20 may be defined as a power value of interference of first radio frequency module transmitting the signal by using the first transmit power upper limit with signal reception of the second radio frequency module 20. In this case, to ensure that the second radio frequency module 20 can properly receive a signal sent by a terminal connected to the channel 48, signal strength of the terminal needs to be greater than a product of the designed interference noise of the second radio frequency module 20 and a signal-to-noise ratio (SNR) corresponding to the second radio frequency module 20. In this way, the AP schedules a terminal with great signal strength to the second radio frequency module 20. When the second radio frequency module 20 uses different modulation and coding schemes, requirements for the signal-to-noise ratio are also different. Therefore, the signal-to-noise ratio corresponding to the second radio frequency module 20 may change with a modulation and coding scheme used by the second radio frequency module 20.

The foregoing processor 30 is configured to schedule a terminal whose signal strength is greater than a threshold and that of in at least one terminal associated with the AP by using the first radio frequency module 10, so that after being scheduled, the terminal whose signal strength is greater than the threshold is associated with the AP by using the second radio frequency module 20.

The isolation between the first radio frequency module 10 and the second radio frequency module 20 is 60 dB, and the designed interference noise of the second radio frequency module 20 is −82 dBm. Therefore, to ensure that the second radio frequency module 20 can properly receive the signal sent by the terminal connected to the channel 48, the signal strength of the terminal needs to be greater than the product of the foregoing designed interference noise of the second radio frequency module 20 and the SNR corresponding to the second radio frequency module 20. The processor 30 may determine, according to the foregoing designed interference noise of the second radio frequency module 20 and the SNR corresponding to the second radio frequency module 20, for example, the SNR of 48 dB, a threshold for signal strength of a terminal connected to the second channel. The foregoing threshold for the signal strength of the terminal is the product of the designed interference noise of the second radio frequency module 20 and the SNR corresponding to the second radio frequency module 20. It is assumed that the foregoing threshold is Q3, and Q3=−82 dBm×48 dB. It can be learned that Q3 is −34 dBm. The processor 30 may schedule a terminal whose signal strength is greater than the foregoing Q3 and that is of one or more terminals associated with the AP by using the first radio frequency module 10, so that after being scheduled, the foregoing terminal whose signal strength is greater than Q3 is associated with the foregoing AP by using the second radio frequency module 20.

Optionally, after determining the signal strength threshold Q3 of the terminal, the processor 30 may obtain a received signal strength indication (RSSI) of uplink signal strength of each terminal connected to the first channel (that is, the channel 149). According to the foregoing RSSI of each terminal, a terminal whose uplink signal strength is greater than the foregoing signal strength threshold (that is, Q3) is instructed to connect to the second channel (that is, the channel 48), that is, the processor 30 may instruct the terminal whose uplink signal strength is greater than Q3 to switch to the second radio frequency module.

Optionally, the processor 30 may instruct the first radio frequency module 10 to send a disassociation frame to the terminal, so as to disconnect association between the terminal and the first radio frequency module 10. Then the terminal scans a connectable channel. In this case, the first radio frequency module 10 maintains a state in which terminal access is not allowed. For example, when the terminal sends a probe request to the first radio frequency module 10, the first radio frequency module 10 gives no reply. After the terminal sends a probe request to the second radio frequency module 20, the second radio frequency module 20 responds to the probe request sent by the terminal, and the terminal connects to the second channel.

Optionally, the processor 30 may also send a channel switch announcement to the terminal, so as to instruct the terminal to switch to the second channel (for example, the channel 48).

Further, when the isolation between the first radio frequency module 10 and the second radio frequency module 20 reaches 60 dB, the foregoing signal strength Q2 of the signal of the first radio frequency module 10 that is received by the second radio frequency module 20 is −82 dBm. Q2 is greater than the CCA threshold of the second radio frequency module 20, and the foregoing CCA threshold of the second radio frequency module 20 is −83 dBm. Because −82 dBm is close to −83 dBm, the signal transmitted by the first radio frequency module 10 does not interfere with the signal transmission of the second radio frequency module 20 in this case. However, in this case, the CCA threshold of the second radio frequency module 20 is quite close to the designed interference noise, and the processor 30 may also raise the CCA threshold of the second radio frequency module 20 to prevent interference caused by another factor not considered in the design. In some scenarios, power of interference with the second radio frequency module 20 by the first radio frequency module 10 of the AP designed according to a relatively low isolation may be greater than the CCA threshold of the second radio frequency module 20. The processor 30 may raise the CCA threshold of the second radio frequency module 20, so that raised CCA threshold of the second radio frequency module 20 is greater than the designed interference noise of the second radio frequency module. The processor 30 may raise the CCA threshold of the second radio frequency module 20 by one or more dBm. In this case, when the processor 30 schedules the terminal, the threshold for the signal strength of the terminal should also be raised accordingly. In this case, the threshold for the signal strength of the terminal may be a product of the raised CCA threshold of the second radio frequency module 20 and the SNR corresponding to the second radio frequency module 20.

In this embodiment of the present invention, when two radio frequency modules of a same frequency band are integrated into a single AP, a first radio frequency module transmits a signal on a first channel by using a first transmit power upper limit, and a second radio frequency module transmits a signal on a second channel by using a second transmit power upper limit that is less than the first transmit power upper limit, which may reduce a requirement, of signal reception and transmission of the first radio frequency module, for an isolation between the first radio frequency module and the second radio frequency module. The AP may further schedule, by using a processor of the AP, a terminal whose signal strength is greater than a threshold and that of in multiple terminals associated with the AP by using the first radio frequency module, so that after being scheduled, the foregoing terminal whose signal strength is greater than the threshold is associated with the AP by using the second radio frequency module. In this way, it is ensured that the second radio frequency module can properly receive a signal sent by a terminal connected to the second channel, which may reduce signal interference between the two radio frequency modules of a same frequency band and reduce complexity of hardware design for integrating two radio frequency modules of a same frequency band into one AP.

Figure 3:
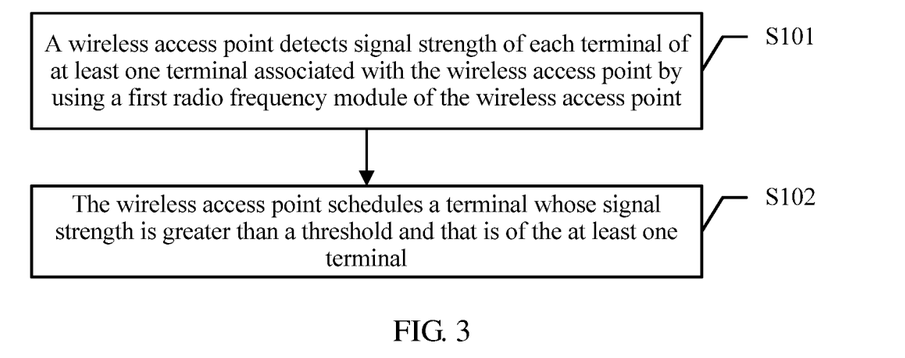
FIG. 3 is a schematic flowchart of a signal interference reduction method according to an embodiment of the present invention.

FIG. 3 is a schematic flowchart of a signal interference reduction method according to an embodiment of the present invention. The method described in this embodiment of the present invention includes the following steps.

S101. Detect signal strength of each terminal of at least one terminal associated with a wireless access point by using a first radio frequency module included in the wireless access point.

S102. Schedule a terminal whose signal strength is greater than a threshold and that is of all the terminals.

In specific implementation, the signal interference reduction method provided in this embodiment of the present invention may be applied to the access point provided in the foregoing embodiment shown in FIG. 1. For a specific implementation manner, refer to the implementation manner described in the foregoing embodiment, and details are not described herein.

In this embodiment of the present invention, when two radio frequency modules of a same frequency band are integrated into a single AP, a first radio frequency module transmits a signal on a first channel by using a first transmit power upper limit, and a second radio frequency module transmits a signal on a second channel by using a second transmit power upper limit that is less than the first transmit power upper limit, which may reduce a requirement, of signal reception and transmission of the first radio frequency module, for an isolation between the first radio frequency module and the second radio frequency module. A terminal whose signal strength is greater than a threshold and that is of multiple terminals associated with the AP by using the first radio frequency module is scheduled, so that after being scheduled, the foregoing terminal whose signal strength is greater than the threshold is associated with the AP by using the second radio frequency module. In this way, it is ensured that the second radio frequency module can properly receive a signal sent by a terminal connected to the second channel, which may reduce signal interference between the two radio frequency modules of a same frequency band and reduce complexity of hardware design for integrating two radio frequency modules of a same frequency band into one AP.

Persons of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What are disclosed above are merely exemplary embodiments of the present invention. The protection scope of the present invention shall be subject to the protection scope of the claims.

What is claimed is:

1. A wireless local area network (WLAN) access point comprising:
   at least two radio frequency modules, wherein
      the at least two radio frequency modules comprise a first radio frequency module configured to operate on a first channel of a WLAN frequency band and a second radio frequency module configured to operate on a second channel of the WLAN frequency band, wherein the first radio frequency module comprises a first modulation circuit and a first demodulation circuit, and wherein the second radio frequency module comprises a second modulation circuit and a second demodulation circuit,
      wherein the WLAN frequency band comprises a plurality of WLAN channels,
      wherein the first channel and the second channel are different channels of the plurality of WLAN channels,
      a first transmit power upper limit of the first radio frequency module is greater than a second transmit power upper limit of the second radio frequency module,
      the first transmit power upper limit is a maximum transmit power usable by the first radio frequency module, and
      the second transmit power upper limit is a maximum transmit power usable by the second radio frequency module;
   a processor; and
   a memory storing a program to be executed by the processor, the program comprising instructions to schedule a terminal that is connecting to the WLAN access point via the first radio frequency module on the first channel, when signal strength of the terminal is greater than a threshold, to switch the terminal from connecting to the WLAN access point via the first radio frequency module on the first channel to connecting to the WLAN access point via the second radio frequency module on the second channel; and
   wherein a first isolation between the first radio frequency module and the second radio frequency module is less than a second isolation between the first radio frequency module and the second radio frequency module that is required when transmit power upper limits of the first radio frequency module and the second radio frequency module are both the first transmit power upper limit.

2. The WLAN access point according to claim 1, wherein the threshold is a product of designed interference noise of the second radio frequency module and a signal-to-noise ratio corresponding to the second radio frequency module, and the designed interference noise of the second radio frequency module is a power value of interference with signal reception of the second radio frequency module caused by the first radio frequency module transmitting a signal by using the first transmit power upper limit.

3. The WLAN access point according to claim 1, wherein the program comprises further instructions to:
   raise a clear channel assessment (CCA) threshold of the second radio frequency module, wherein a raised CCA threshold of the second radio frequency module is greater than designed interference noise of the second radio frequency module, wherein
      the designed interference noise of the second radio frequency module is a power value of interference with signal reception of the second radio frequency module caused by the first radio frequency module transmitting a signal by using the first transmit power upper limit.

4. The WLAN access point according to claim 3, wherein the threshold is a product of the raised CCA threshold of the second radio frequency module and a signal-to-noise ratio corresponding to the second radio frequency module.

5. The WLAN access point according to claim 1, wherein
   the first transmit power upper limit is a first transmit power value of the first radio frequency module working at full power, and
   the second transmit power upper limit is a second transmit power value of the second radio frequency module working at full power.

6. The WLAN access point according to claim 1, wherein the second transmit power upper limit is set to be less than a maximum transmit power value of the second radio frequency module.

7. The WLAN access point according to claim 1, wherein the second transmit power upper limit is about half of the first transmit power upper limit.

8. A signal interference reduction method comprising:
   detecting, by a wireless local area network (WLAN) access point comprising a first radio frequency module configured to operate on a first channel of a WLAN frequency band and a second radio frequency module configured to operate on a second channel of the WLAN frequency band, signal strength of a terminal that is being associated with the WLAN access point via the first radio frequency module on the first channel, wherein the first radio frequency module comprises a first modulation circuit and a first demodulation circuit, and wherein the second radio frequency module comprises a second modulation circuit and a second demodulation circuit; and
   scheduling, by the WLAN access point, the terminal, when the signal strength of the terminal is greater than a threshold, to switch the terminal from connecting to the WLAN access point via the first radio frequency module on the first channel to connecting to the WLAN access point via the second radio frequency module on the second channel,
   wherein the WLAN frequency band comprises a plurality of WLAN channels, wherein the first channel and the second channel are different channels of the plurality of WLAN channels,
   a first transmit power upper limit of the first radio frequency module is greater than a second transmit power upper limit of the second radio frequency module,
   the first transmit power upper limit is a maximum transmit power usable by the first radio frequency module, and the second transmit power upper limit is a maximum transmit power usable by the second radio frequency module; and wherein a first isolation between the first radio frequency module and the second radio frequency module is less than a second isolation between the first radio frequency module and the second radio frequency module that is required when transmit power upper limits of the first radio frequency module and the second radio frequency module are both the first transmit power upper limit.

9. The method according to claim 8, wherein the threshold is a product of designed interference noise of the second radio frequency module and a signal-to-noise ratio corresponding to the second radio frequency module, and the designed interference noise of the second radio frequency module is a power value of interference with signal reception of the second radio frequency module caused by the first radio frequency module transmitting a signal by using the first transmit power upper limit.

10. The method according to claim 8, further comprising:

raising, by the WLAN access point, a clear channel assessment (CCA) threshold of the second radio frequency module, wherein a raised CCA threshold of the second radio frequency module is greater than designed interference noise of the second radio frequency module, wherein the designed interference noise of the second radio frequency module is a power value of interference with signal reception of the second radio frequency module caused by the first radio frequency module transmitting a signal by using the first transmit power upper limit.

11. The method according to claim 10, wherein the threshold is a product of the raised CCA threshold of the second radio frequency module and a signal-to-noise ratio corresponding to the second radio frequency module.

12. The method according to claim 8, wherein the first transmit power upper limit is a first transmit power value of the first radio frequency module working at full power, and the second transmit power upper limit is a second transmit power value of the second radio frequency module working at full power.

13. The method according to claim 8, wherein the second transmit power upper limit is set to be less than a maximum transmit power value of the second radio frequency module.

14. The method according to claim 8, wherein the second transmit power upper limit is about half of the first transmit power upper limit.

15. A wireless access point comprising:

at least two radio frequency communication circuits comprising a first radio frequency module configured to operate on a first channel of a WLAN frequency band and a second radio frequency module configured to operate on a second channel of the WLAN frequency band, wherein the first radio frequency module comprises a first modulation circuit and a first demodulation circuit, and wherein the second radio frequency module comprises a second modulation circuit and a second demodulation circuit, wherein the first channel is selected from a first channel set, the second channel is selected from a second channel set, an intersection of the first channel set and the second channel set is an empty set, a first transmit power upper limit of the first radio frequency module is greater than a second transmit power upper limit of the second radio frequency module;

a processor; and a memory storing a program to be executed in the processor, the program comprising instructions to schedule a terminal that is connecting to the wireless access point via the first radio frequency module on the first channel, when signal strength of the terminal is greater than a threshold, to switch the terminal from connecting to the wireless access point by using the first radio frequency module on the first channel to connecting to the wireless access point by using the second radio frequency module on the second channel; and wherein a first isolation between the first radio frequency module and the second radio frequency module is less than a second isolation between the first radio frequency module and the second radio frequency module that is required when transmit power upper limits of the first radio frequency module and the second radio frequency module are both the first transmit power upper limit.

16. The wireless access point according to claim 15, wherein the threshold is a product of designed interference noise of the second radio frequency module and a signal-to-noise ratio corresponding to the second radio frequency module, and the designed interference noise of the second radio frequency module is a power value of interference with signal reception of the second radio frequency module caused by the first radio frequency module transmitting a signal by using the first transmit power upper limit.

17. The wireless access point according to claim 15, wherein the wireless access point is a wireless local area network (WLAN) access point.

* * * * *